United States Patent
Livingston et al.

(10) Patent No.: US 7,976,282 B2
(45) Date of Patent: Jul. 12, 2011

(54) PREFORM SPAR CAP FOR A WIND TURBINE ROTOR BLADE

(75) Inventors: Jamie T. Livingston, Simpsonville, SC (US); Howard D. Driver, Greer, SC (US); Sjef van Breugel, Enschede (NL); Thomas B. Jenkins, Cantonment, FL (US); Jan Willem Bakhuis, Nijverdal (NL); Andrew J. Billen, Daarlerveen (NL); Amir Riahi, Pensacola, FL (US)

(73) Assignee: General Electric Company, Schenectady, NY (US)

( * ) Notice: Subject to any disclaimer, the term of this patent is extended or adjusted under 35 U.S.C. 154(b) by 1053 days.

(21) Appl. No.: 11/627,490

(22) Filed: Jan. 26, 2007

(65) Prior Publication Data
US 2008/0181781 A1    Jul. 31, 2008

(51) Int. Cl.
*F03D 11/00* (2006.01)

(52) U.S. Cl. .................... 416/226; 416/229 R; 416/233; 29/889.7

(58) Field of Classification Search .............. 416/223 R, 416/226, 229 R, 230, 232, 233
See application file for complete search history.

(56) References Cited

U.S. PATENT DOCUMENTS

| | | | |
|---|---|---|---|
| 4,805,287 A * | 2/1989 | Perini et al. ................. | 156/304.5 |
| 6,940,186 B2 | 9/2005 | Weitkamp | |
| 7,086,834 B2 | 8/2006 | LeMieux | |
| 7,118,338 B2 | 10/2006 | Moroz et al. | |
| 7,153,090 B2 * | 12/2006 | DeLeonardo et al. ......... | 415/4.2 |
| 7,377,752 B2 * | 5/2008 | Mohamed ..................... | 416/226 |
| 2005/0186081 A1 | 8/2005 | Mohamed | |
| 2006/0067827 A1 | 3/2006 | Moroz | |
| 2006/0225278 A1 | 10/2006 | Lin et al. | |
| 2007/0013194 A1* | 1/2007 | Calley ........................... | 290/44 |
| 2007/0251090 A1* | 11/2007 | Breugel et al. ............... | 29/889.7 |
| 2009/0162208 A1* | 6/2009 | Zirin et al. .................... | 416/226 |

\* cited by examiner

*Primary Examiner* — Edward Look
*Assistant Examiner* — Ryan H Ellis
(74) *Attorney, Agent, or Firm* — Sutherland Asbill & Brennan LLP

(57) ABSTRACT

A spar cap for a wind turbine rotor blade. The spar cap may include multiple preform components. The multiple preform components may be planar sheets having a swept shape with a first end and a second end. The multiple preform components may be joined by mating the first end of a first preform component to the second end of a next preform component, forming the spar cap.

25 Claims, 4 Drawing Sheets

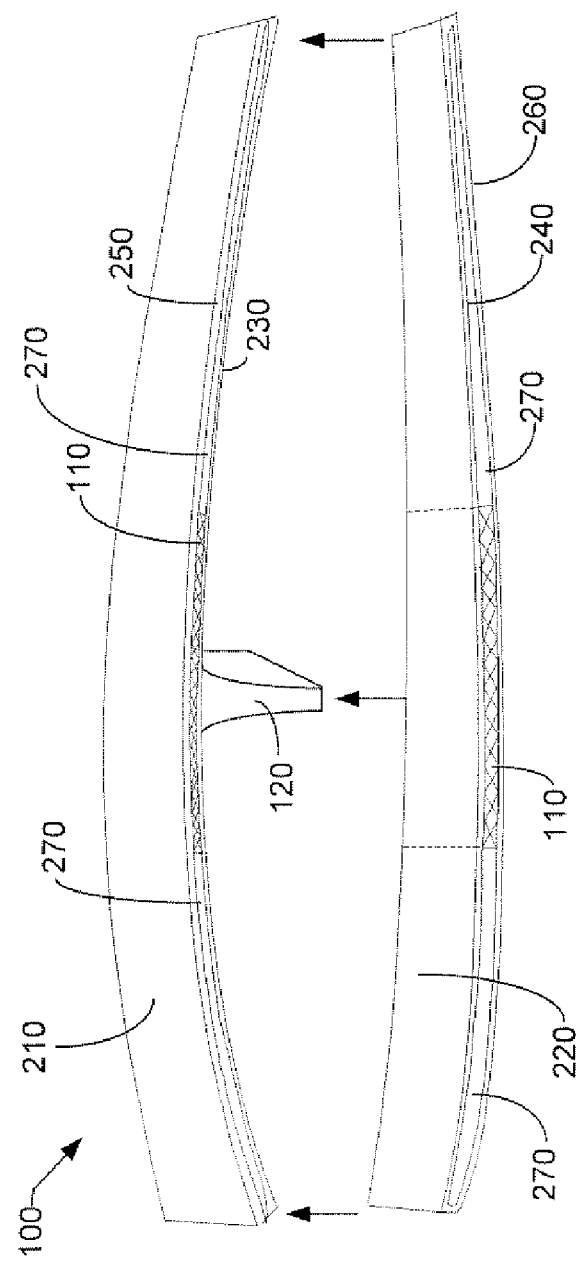
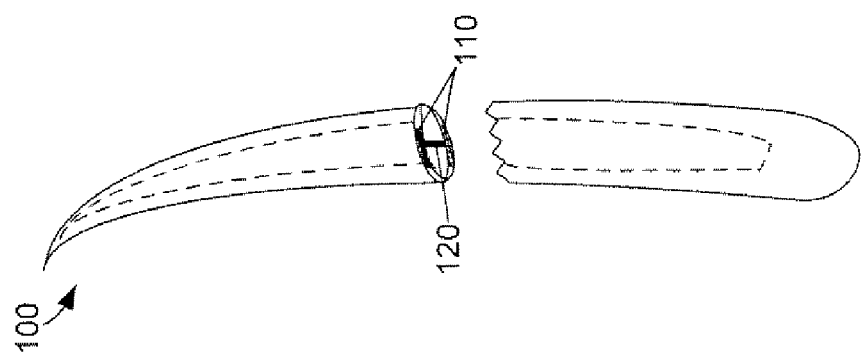
Fig. 2
Fig. 1

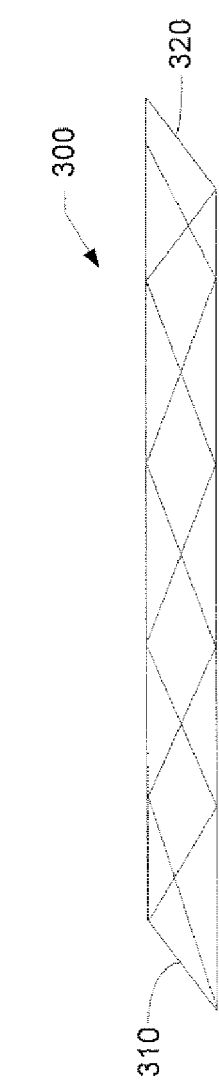
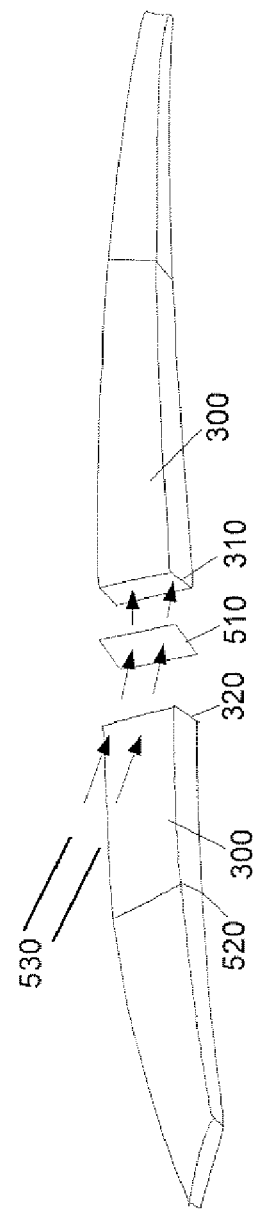
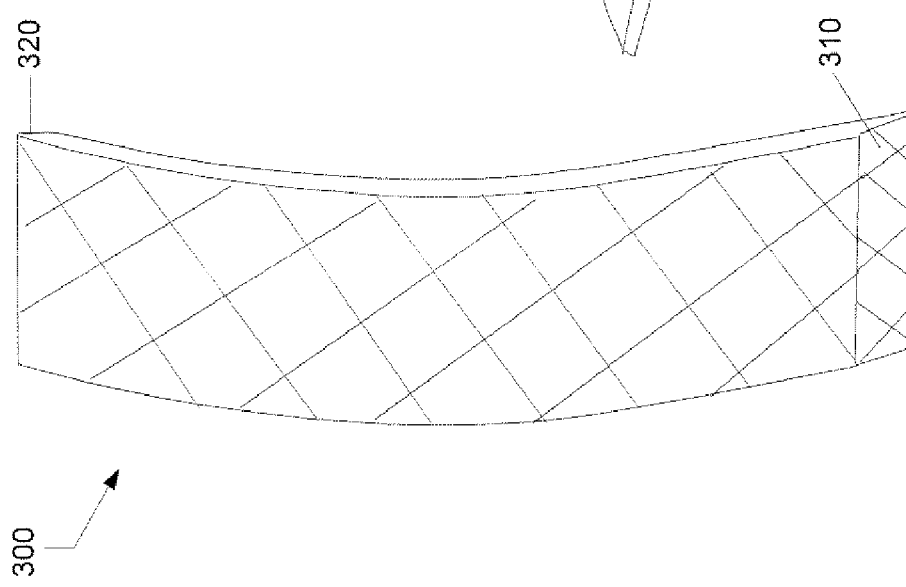
Fig. 4
Fig. 5
Fig. 3

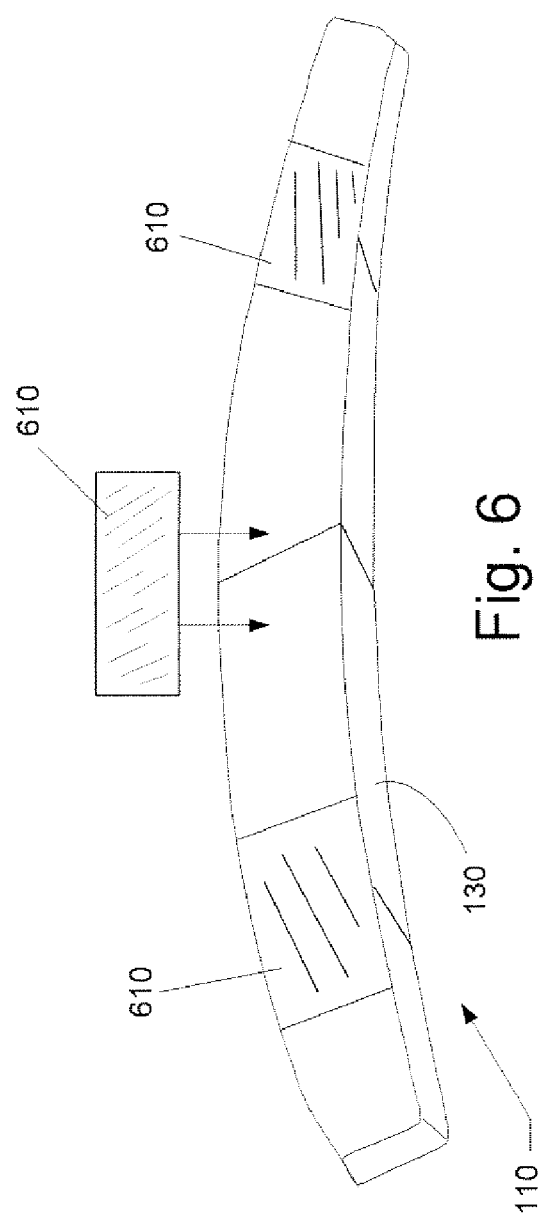
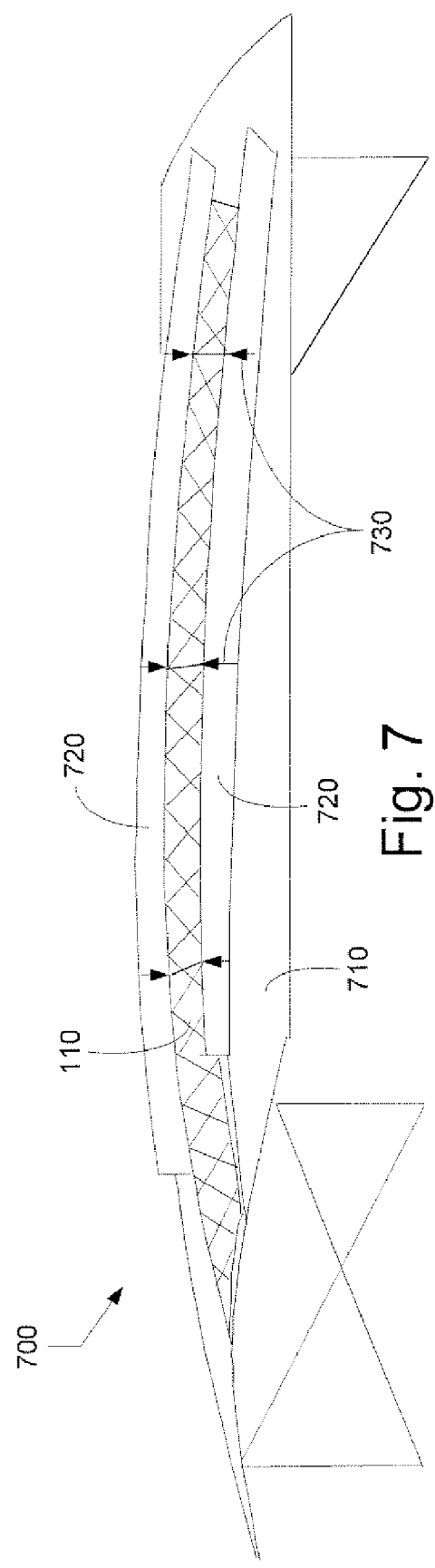

PREFORM SPAR CAP FOR A WIND TURBINE ROTOR BLADE

STATEMENT REGARDING FEDERALLY SPONSORED RESEARCH OR DEVELOPMENT

The federal government may have certain rights in this invention by virtue of the United States Department of Energy Contract No. DE-AC36-99-GO10337 and Contract No. ZAM43123505.

TECHNICAL FIELD

The present application relates generally to preform composite components and more particularly relates to spar caps having preform composite components and methods of manufacturing spar caps having perform composite components.

BACKGROUND OF THE INVENTION

Wind power and the use of wind turbines have gained increased attention as the quest for alternative energy sources continues. Wind power may be considered one of the cleanest, most environmentally friendly energy sources presently available. Different from traditional fossil fuel sources, wind power is completely renewable and does not produce noxious or environmentally harmful bi-products. With an increasing attention towards generating more energy from wind power, technological advances in the art have allowed for increased sizes of wind turbines and new designs of wind turbine components. However, as the physical sizes and availability of wind turbines increase, so does the need to balance the cost of manufacturing and operating wind turbines to further allow wind power to be cost-competitive with other energy sources.

A modern wind turbine typically includes a tower, generator a gearbox, a nacelle, and one more rotor blades. The rotor blades capture kinetic energy of wind using foil principles known in the art. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. However, size and shape produce opposite effects on efficiency an increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines are capable of generating between one and one-half megawatts to five megawatts of power. Some of the larger wind turbines have rotor blade assemblies larger than 90 meterse in diameter. Additionally, advances in rotor blade shape encourage the manufacture of a forward swept-shaped rotor blade having a general arcuate contour from the base to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

The construction of a modern rotor blade includes a skin or shell, spar caps, and one or more shear webs. The skin, typically manufactured from layers of fiber composite and a lightweight core material, forms the exterior aerodynamic foil shape of the rotor blade. The spar caps provide increased rotor blade strength by integrating one or more structural elements running along the length of the rotor blade on both interior sides of the rotor blade. Shear webs are like a cross-beam or i-beam running essentially perpendicular to the top and bottom spar caps and extending across the interior portion of the rotor blade between the outer skins. Spar caps have typically been constructed from glass fiber reinforced composites, though some larger blades are beginning to include spar caps constructed from carbon fiber reinforced composites.

For swept-shaped rotor blades, the spar caps need to be constructed so as to have a general contour following the curvature of the rotor blade. However, a problem with the current state of the art is that the spar caps made from composites of fibrous materials wrinkle or bunch around the inside curve when formed into a swept shape.

For larger rotor blades, regardless of their shape, problems exist in creating the spar caps that are strong enough without adding excessive weight to the rotor blades. Further, the larger the rotor blade the larger the spar cap is, and therefore, the transportation of the spar caps from the place of manufacture to the assembly location becomes increasingly difficult with size.

There is a desire, therefore, to form a swept-shaped spar cap that maintains the strength and structural integrity of fiber material without creating wrinkles or bunches in the fibers. There is a further desire to construct spar caps, regardless of shape, in a manner that promotes easier and lower-cost transportation, considering the size of an assembled spar cap.

BRIEF DESCRIPTION OF THE INVENTION

The present invention thus provides a spar cap for a wind turbine rotor blade. In one embodiment of the present invention the spar cap may include multiple preform components. The multiple preform components may be planar sheets having a swept shape with a first end and a second end. The multiple preform components may be joined by mating the first end of a first preform component to the second end of a next preform component.

A further embodiment of the present invention may provide a method for forming a spar cap. The spar cap may be formed by aligning multiple preform components. The multiple preform components may have a swept shape and may further have a first end and a second end. The multiple preform components may then be joined to form the spar cap.

Yet a further embodiment of the present invention may provide a wind turbine rotor blade. The wind turbine rotor blade may include a first shell, a second shell, a first spar cap, a second spar cap, and at least one shear web. The first and second spar caps may be constructed from multiple preform components having a swept shape and from a fibrous material. The multiple preform components may each have a first end and a second end. The multiple preform components may be joined to form the spar caps by forming a scarf joint between the first end of a first preform component and the second end of a second preform component. The first spar cap may be integrated with the first shell and the second spar cap may be integrated with the second shell. The shear web may be integrated with the first shell and the second shell and may be substantially aligned with the first spar cap and the second spar cap. The first shell may be joined to the second shell forming the wind turbine rotor blade. The wind turbine rotor blade may have a swept shape and the multiple preform components forming the spar cap may also have a swept shape generally following that of the wind turbine rotor blade.

These and other features of the present application will become apparent to one of ordinary skill in the art upon review of the following detailed description when taken in conjunction with the several drawings and the appended claims.

BRIEF DESCRIPTION OF THE DRAWINGS

FIG. 1 is a perspective view of an example of a swept-shaped rotor blade, having a cross-section removed to view the shells, the spar caps, and the shear web.

FIG. 2 is an exploded, cross-sectional view of the rotor blade of FIG. 1.

FIG. 3 is a perspective view of a single preform component that comprises the spar cap of FIG. 1.

FIG. 4 is a side perspective view of a single preform component that comprises the spar cap of FIG. 1.

FIG. 5 is an exploded, perspective view of multiple preform components of FIG. 3 in assembly.

FIG. 6 is a perspective view of multiple preform components of FIG. 3 in assembly.

FIG. 7 is a perspective view of a molding tool used during assembly as in FIGS. 5 and 6.

DETAILED DESCRIPTION OF THE INVENTION

Figure 8:
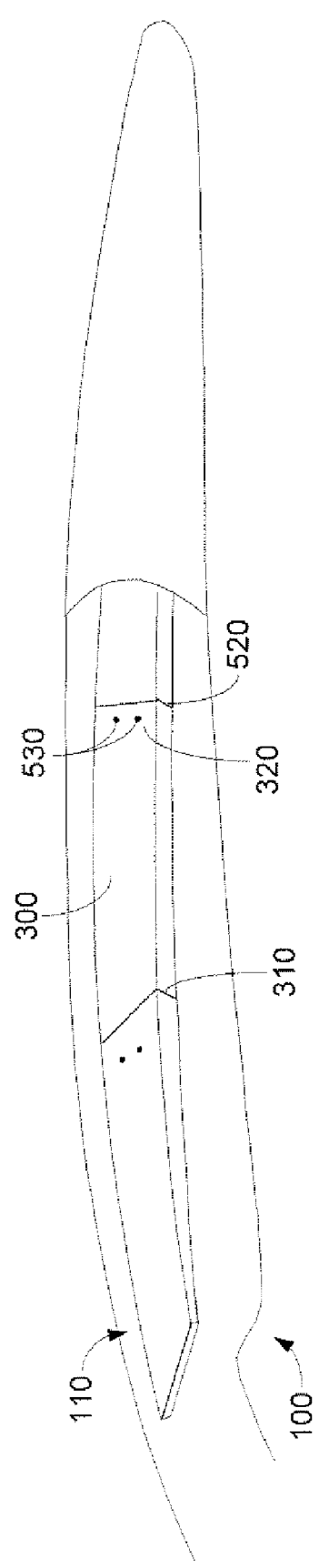
FIG. 8 is a sectional view of an assembled spar cap and rotor blade of FIG. 1.

Referring now to the drawings, in which like numerals indicate like elements throughout the several views, FIG. 1 is an exemplary illustration of a rotor blade 100 with a cross section removed showing a pair of spar caps 110 and a shear web 120 integrated therein. The rotor blade 100 may be used, for example, in a wind turbine. The rotor blade 100 may have a swept shape giving it a curved contour running from the distal end to the proximal end of the rotor blade 100. At least two spar caps 110 may be integrated within the rotor blade 100, generally running from its distal end to its proximal end and having generally the same swept shape as the rotor blade 100. At least one shear web 120 may also run generally from the distal to the proximal end of the rotor blade 100, may have generally the same swept shape, and may be joined to the inside surfaces of each spar cap 110 at an approximately perpendicular orientation. It should be appreciated that the same general configuration, including the spar caps 110 and one or more shear webs 120, applies to a rotor blade 100 not having a swept shape.

FIG. 2 is an exemplary illustration of a cross section of the rotor blade 100 of the present application. The rotor blade 100 may include a first shell 210 and a second shell 220, where the first shell 210 may form the top of the rotor blade 100 and the second shell 220 may form the bottom of the rotor blade 100. The first shell 210 and the second shell 220 may include a first and a second inner skin 230, 240, and a first and a second outer skin 250, 260, and each may be constructed, for example, from dry, fibrous material. Further, the first and the second shell 210, 220 may include a core material 270 sandwiched between the inner skin 230, 240 and the outer skin 250, 260 of each shell. The core material 270 is preferably a lightweight material, such as balsa wood, Styrofoam, or the like as is known in the art. The spar cap 110 may be placed between the inner skin 230, 240 and the outer skin 250, 260 and adjacent to the core material 270 in each shell.

The first shell 210 and the second shell 220 may be constructed individually by first aligning each of the inner skins 230, 240 the spar cap 110, and the outer skins 250, 260 as illustrated in FIG. 2. Next, all of the components may be coated with resin and wrapped with a bag. A vacuum creating negative pressure may be applied to the bag, allowing the resin to impregnate all of the components. Finally, the shells then may be cured with heat. After each shell 210, 220 is formed and cured, the shear web 120 may be adhered to the portion of the first inner skin 230 that is adhered to the spar cap 110 at an approximately perpendicular orientation, resulting in the first shell 210 having the shear web 120 attached to the first inner skin 230 and aligned with the spar cap 110. The cured second shell 220 may be adhered to the first shell 210, affixing the portion of the second inner skin 240 that is adhered to the spar cap 110 to the free end of the shear web 120, and mating the sides of the second shell 220 with the sides of the first shell 210. A paste adhesive, such as epoxy, esters, methylmethacrylate, or the like as is known in the art, may be used to adhere the shear web 120 to the spar caps 110 and the first and second shells 210, 220 together. Mating the first and the second shells 210, 220, including the shear web 120 with the spar caps 110 creates the final rotor blade 100 assembly. It should be appreciated that the shear web 120 may first be applied to the second shell 220 and the first shell 210 may then be attached thereto.

FIG. 3 is an exemplary illustration of a single preform component 300 that will be joined together in an embodiment of the present invention. The preform component 300 may be constructed of a continuous fibrous material, organic or inorganic, and impregnated with resin, such as epoxy, vinyl-ester, polyester, or the like as is known in the art. The fibrous material of the preform component 300 may have a woven configuration and may be constructed from, for example, carbon, glass, synthetic material, or the like as is known in the art. The preform component 300 may have a length shorter than the desired length of the spar cap 110, and, therefore, multiple preform components 300 may be attached together to form the entire spar cap 110. Each preform component 300 may have a swept contour so that when they are assembled together to form the spar cap 110 they will have the desired swept shape, or banana shape, following the shape of a swept-shaped rotor blade 100. It should also be appreciated that the preform component 300 may be substantially straight and may be used to assemble a substantially straight spar cap 110 in the same manner as just described. The preform component 300 may have a first angled end 310 forming an obtuse angle with the top side of the preform component 300. The preform component may have a second angled end 320, opposite the first angled end 310, forming an acute angle with the top side of the preform component 300. The second angled end 320 may be formed at a supplementary angle to the angle of the first angled end 310. FIG. 4 shows an example of a side view of the preform component 300 having the first angled end 310 and the second angled end 320. When attaching multiple preform components 300 together, the first angled end 310 of a first preform component 300 may align and completely mate with the second angled end 320 of a second preform component 300, forming a scarf joint 520, as is further described in reference to FIG. 5 herein.

FIG. 5 is an exemplary illustration of attaching multiple preform components 300 to form the spar cap 110. The first preform component 300, having the first angled end 310, may be mated with the second preform component 300, having the second angled end 320, placing an intervening joint interface layer 510 in between the two angled ends 310, 320, and creating the scarf joint 520. The joint interface layer 510 may be a polymer material and may further include a fiber substrate, such as fiberglass or the like as is known in the art. One or more pins 530 may be inserted through the mated scarf joint 520. The pins 530 may be constructed from a rigid material such as a sturdy metal; however, the pins 530 need not be metallic. Further, the pins 530 need not be cylindrical in shape, but may be any shape that will form continuous contact through the scarf joint 520 and the first and second preform component 300, such as a flat sheet, a ridged sheet, or the like. The pins 530 further strengthen the scarf joint 520 in the out-of-plane direction while also maintain alignment between the contiguous preform components 300 while forming the entire spar cap 110. FIG. 6 shows an exemplary embodiment of multiple preform components 300 having one or more facing plies 610 on at least one side of the spar cap 110 and covering the scarf joints 520. The facing plies 610 may be a polymer material and may further include a fiber substrate, such as fiberglass or the like as is known in the art. The facing plies 610, like the pins 530, further strengthen the scarf joint and maintain alignment between the contiguous preform components 300. It is appreciated that while FIG. 6 shows the facing plies 610 on only one side of the spar cap 110 the facing plies 610 may be applied to either or both sides of the spar cap 110. It is also contemplated that multiple preform components 300 may be joined in a side-by-side configuration as well as an end-to-end configuration. In this embodiment, the sides of each preform component 300 may have supplementary acute and obtuse angles so a scarf joint, like that described above, may be formed between the preform components 300 sitting side-by-side as well as end-to-end.

FIG. 7 is an exemplary illustration of a molding tool 700 that may be used to fabricate the spar cap 110 from multiple preformed components 300. Because the preform components 300 may be flat when first received from the manufacturer, the molding tool 700 may be used to form the preform components 300 into an arcuate, rather than flat, shape. The arcuate shape will follow the arc of the rotor blade 100 from the leading edge to the trailing edge as is shown in FIG. 2. The molding tool 700 includes a convex form 710 with a surface having a convex curve following the arcuate shape of the first shell 210 or the second shell 220 of the rotor blade 100. To form the spar cap 110, multiple preform components 300 may be laid over the convex form 710 and aligned end-to-end. The convex form 710 also may include one or more alignment fences 720 that will communicate with one side of the preform components 300 when laid on the convex form 710, further maintaining alignment of the contiguous preform components 300. In an exemplary embodiment, one alignment fence 720, or a series of alignment fences 720, are placed on each side of the convex form 710 and opposite each other to hold the preform components 300 in place. Finally, the alignment fence 720 may include alignment markings 730 along the length of the fence to identify where to align each of the preform components 300. In one embodiment of the present invention, two different molding tools 700 may be employed, whereby a first molding toot 700 includes the convex mold form 710 having the shape of the first shell 210 forming the top skin of the rotor blade 100 and whereby a second molding tool 700 includes the convex mold form 710 having the shape of the second shell 220 forming the bottom skin of the rotor blade 100.

FIG. 8 is an exemplary illustration of the spar cap 110 after final construction and integrated with the rotor blade 100. A spar cap 110 may include multiple preform components 300 lying end-to-end and attached by the scarf joint 520. It should be appreciated that the width of the multiple preform components 300 may not be the same, allowing the spar cap 110 to narrow at one or both ends and remain wider in the middle sections. Further, the thickness of the multiple preform components 300 may not be the sane, allowing for the spar cap 110 to taper in thickness at one or both ends and remain thicker in the middle sections. It should further be appreciated that, while FIG. 8 shows the spar cap 110 constructed from four of the preform components 300, any number of the preform components 300 may be used to achieve the necessary length and the desired swept shape contour, considering the size and availability of the preform components 300. Additionally, whereas FIG. 8 shows a swept-shaped spar cap 110, it should be appreciated that a generally straight-shaped spar cap 110 may be formed from multiple preform components 300 not having a curved shape.

It should be apparent that the foregoing relates only to exemplary embodiments of the present application and that numerous changes and modifications may be made herein by one of ordinary skill in the art without departing from the general spirit and scope of the invention as defined by the following claims and the equivalents thereof.

We claim:

1. A spar cap, comprising:
   a plurality of preform components configured to be affixed together in an end-to-end arrangement successively along a length of a rotor blade for forming a spar cap;
   wherein:
      said plurality of preform components each has a swept shape;
      said plurality of preform components each has a first end and a second end;
      said plurality of preform components are joined by mating said second end of a first preform component to said first end of a next preform component generally aligning along the length of the rotor blade;
      an angle of said first end is supplementary to an angle of said second end, wherein mating said second end of said first preform component with said first end of said next preform component comprises a scarf joint; and
      further comprising at least one pin, wherein said at least one pin extends through said first preform component and said next preform component forming said scarf joint.

2. The spar cap of claim 1, wherein said spar cap is integrated with a first shell of a rotor blade and further comprises:
   a shear web attached to the inner surface of said first shell and generally aligned with said spar cap; and
   a second shell having a second spar cap integrated therein and joined to said first shell, wherein said shear web is attached to said second shell and is generally aligned with said second spar cap.

3. The spar cap of claim 1, wherein the swept shape of each of said plurality of preform components defines an arc between said first end and said second end of the respective preform component, wherein said arc generally follows a portion of a swept shape of the rotor blade from its distal end to its proximal end.

4. The spar cap of claim 1, further comprising a joint interface layer, wherein said joint interface layer exists between said first end and said second end, and wherein said joint interface layer is a polymer material.

5. The spar cap of claim 1, further comprising:
   at least one facing ply, wherein:
      said at least one facing ply communicates with at least one side of said spar cap;
      said at least one facing ply overlaps said first end and said second end; and
      said at least one facing ply is a polymer material.

6. A spar cap, comprising:
a plurality of preform components configured to be affixed together in an end-to-end arrangement successively along a length of a rotor blade for forming a spar cap; wherein:
said plurality of preform components each has a swept shape;
said plurality of preform components each has a first end and a second end;
said plurality of preform components are joined by mating said second end of a first preform component to said first end of a next preform component generally aligning along the length of the rotor blade; and
further comprising a joint interface layer, wherein said joint interface layer exists between said first end and said second end, and wherein said joint interface layer is a polymer material.

7. The spar cap of claim 6, wherein said joint interface layer further comprises a fibrous substrate.

8. The spar cap of claim 6, wherein the swept shape of each of said plurality of preform components defines an arc between said first end and said second end of the respective preform component, wherein said arc generally follows a portion of a swept shape of the rotor blade from its distal end to its proximal end.

9. The spar cap of claim 6, wherein said spar cap is integrated with a first shell of a rotor blade and further comprises:
a shear web attached to the inner surface of said first shell and generally aligned with said spar cap; and
a second shell having a second spar cap integrated therein and joined to said first shell, wherein said shear web is attached to said second shell and is generally aligned with said second spar cap.

10. The spar cap of claim 6, further comprising at least one pin, wherein said at least one pin extends through said first preform component and said next preform component.

11. The spar cap of claim 6, further comprising:
at least one facing ply, wherein:
said at least one facing ply communicates with at least one side of said spar cap;
said at least one facing ply overlaps said first end and said second end; and
said at least one facing ply is a polymer material.

12. A spar cap, comprising:
a plurality of preform components configured to be affixed together in an end-to-end arrangement successively along a length of a rotor blade for forming a spar cap; wherein:
said plurality of preform components each has a swept shape;
said plurality of preform components each has a first end and a second end;
said plurality of preform components are joined by mating said second end of a first preform component to said first end of a next preform component generally aligning along the length of the rotor blade; and
further comprising:
at least one facing ply,
wherein:
said at least one facing ply communicates with at least one side of said spar cap;
said at least one facing ply overlaps said first end and said second end; and
said at least one facing ply is a polymer material.

13. The spar cap of claim 12, wherein said at least one facing ply further comprises a fibrous substrate.

14. The spar cap of claim 12, wherein the swept shape of each of said plurality of preform components defines an arc between said first end and said second end of the respective preform component, wherein said arc generally follows a portion of a swept shape of the rotor blade from its distal end to its proximal end.

15. The spar cap of claim 12, wherein said spar cap is integrated with a first shell of a rotor blade and further comprises:
a shear web attached to the inner surface of said first shell and generally aligned with said spar cap; and
a second shell having a second spar cap integrated therein and joined to said first shell, wherein said shear web is attached to said second shell and is generally aligned with said second spar cap.

16. The spar cap of claim 12, further comprising at least one pin, wherein said at least one pin extends through said first preform component and said next preform component.

17. The spar cap of claim 12, further comprising a joint interface layer, wherein said joint interface layer exists between said first end and said second end, and wherein said joint interface layer is a polymer material.

18. A method for forming a spar cap, comprising:
aligning a plurality of preform components having a swept shape comprising a first end and a second end for forming a spar cap, wherein said second end of a first preform component aligns with said first end of a next preform component, wherein said plurality of preform components are configured to be affixed together in an end-to-end arrangement successively along a length of a rotor blade;
joining said aligned plurality of preform components generally aligning along the length of the rotor blade; and
interposing a joint interface layer, wherein said joint interface layer exists between said first end of said first preform component and said second end of sad next preform component, and wherein said joint interface layer is a polymer material.

19. The method of claim 18, further comprising inserting at least one pin through said first preform component and said next preform component where joined.

20. The method of claim 18, further comprising:
attaching at least one facing ply,
wherein:
said at least one facing ply communicates with at least one side of said spar cap;
said at least one facing ply overlaps said first end and said second end; and
said at least one facing ply is a polymer material.

21. The method of claim 18, further comprising:
laying said plurality of preform components over a convex form;
wherein said convex form has substantially the same arcuate shape as a rotor blade into which said spar cap will be integrated; and
wherein laying said plurality of preform components over said convex form causes said plurality of preform components to be shaped into substantially the same arcuate shape as said rotor blade into which said spar cap will be integrated.

22. The method of claim 21, further comprising aligning said plurality of preform components with at least one alignment fence, wherein said at least one alignment fence:
communicates with said convex form;
substantially extends the length of said convex form; and assists to align said plurality of preform components by abutting contiguous edges of said plurality of preform components.

23. The method of claim 22, further comprising aligning said plurality of preform components with at least one alignment marking.

24. The method of claim 23, further comprising:
placing said aligned plurality of preform components under vacuum; and
applying heat to cure said aligned plurality of preform components.

25. The method of claim 18, further comprising:
integrating said spar cap with a first shell of a rotor blade;
aligning a shear web substantially with said spar cap;
attaching said shear web to the inner surface of said first shell;
integrating a second spar cap to a second shell of a rotor blade;
joining said second shell to said first shell, wherein said shear web attaches to said second shell and generally aligns with said second spar cap.

* * * * *